US008421778B2

(12) United States Patent
Wang et al.

(10) Patent No.: US 8,421,778 B2
(45) Date of Patent: Apr. 16, 2013

(54) MODIFICATION DEVICE AND METHOD FOR SELECTIVELY MODIFYING TRANSMISSION PERFORMANCE OF IMAGE FRAME DATA

(75) Inventors: Hsiu-Wen Wang, Jubei (TW); Wei-Hao Yuan, Jubei (TW); Wei-Cheng Chang Chien, Jubei (TW); Ming-Jun Hsiao, Jubei (TW)

(73) Assignee: Alpha Imaging Technology Corp., Hsin Chu (TW)

( * ) Notice: Subject to any disclaimer, the term of this patent is extended or adjusted under 35 U.S.C. 154(b) by 1325 days.

(21) Appl. No.: 12/109,185

(22) Filed: Apr. 24, 2008

(65) Prior Publication Data

US 2009/0046081 A1 Feb. 19, 2009

(30) Foreign Application Priority Data

Aug. 16, 2007 (TW) ................................ 96130374 A

(51) Int. Cl.
*G06F 3/038* (2006.01)
*G09G 5/00* (2006.01)
*G06T 1/60* (2006.01)

(52) U.S. Cl.
USPC ........................................... 345/204; 345/530

(58) Field of Classification Search .................. 345/204; 710/100
See application file for complete search history.

(56) References Cited

U.S. PATENT DOCUMENTS

2007/0180179 A1* 8/2007 Irisa ............................. 710/307

FOREIGN PATENT DOCUMENTS

TW 200504578 A 2/2005

* cited by examiner

*Primary Examiner* — Jacinta M Crawford

(57) ABSTRACT

A device and method is provided to selectively modify the transmission performance of a frame data. Through a parallel transmission interface, the frame data is transmitted under a corresponding interface protocol and transmitted toward an image display. The method first detects a data size of the frame data and then provides a transmission control signal based on the detection of the data size. Next, selectively divide the frame data by a factor M based on the transmission control signal. Furthermore, transmit the divided frame data at a raised clock rate based on the factor M. Afterwards, temporarily store the divided frame data about to be transmitted toward the image display until the whole frame data is transmitted.

21 Claims, 7 Drawing Sheets

MODIFICATION DEVICE AND METHOD FOR SELECTIVELY MODIFYING TRANSMISSION PERFORMANCE OF IMAGE FRAME DATA

CROSS-REFERENCES TO RELATED APPLICATIONS

This non-provisional application claims priority under 35 U.S.C. §119(a) on Patent Application No(s). 096130374 filed in Taiwan, R.O.C. on 2007/8/16, the entire contents of which are hereby incorporated by reference.

FIELD OF INVENTION

The present invention relates to image processing and transmitting, and more particularly to a modification device and method for selectively modifying the transmission performance of image frame data transmitted to an image display.

BACKGROUND

As to image display or access control of liquid crystal display (LCD), traditionally image frame data stored in a memory is transmitted by a control apparatus of the LCD toward a LCD panel for display. Please refer to FIG. 1A, which is a schematic block diagram showing the basic architecture of a LCD control apparatus in the prior art. A LCD control apparatus A10 includes a frame data control module A20 and a panel control module A30. The frame data control module A20 processes frame data stored in memory A40 and then transmits to the panel control module A30. According to a communication protocol between the panel control module A30 and the LCD panel A50, the panel control module A30 further sends a control signal and the frame data to a control circuit in the LCD panel A50. The control circuit of LCD panel A50 will then process the frame data according to the control signals, and further display the frame data on LCD panel A50.

Please also refer to FIG. 1B, which is a schematic diagram showing the transmission of the control signal and the frame data. The control signals here are mainly used for writing the frame data into LCD panel A50. As shown in the drawing, when the control signals are at a specific state (shown as downward arrows), the frame data will then be written into the LCD panel A50 and the frame data is displayed on the LCD panel A50. The LCD control apparatus A10 is connected to the LCD panel A50 through a transmission interface A60, and meanwhile the frame data and the control signal are also transmitted to the LCD panel A50 through the transmission interface A60.

However, recently transmission interface manufacturers have gradually reduced the bus width of transmission interface A60 in order to reduce production costs. Consequently, the amount of frame data transmitted each time is likewise reduced due to the reduction of the bus width. Such changes cause some matching problems between the data size of the frame data and the transmission width (namely bus size or bus width) of the transmission interface toward the LCD panel. As a result, the image displayed on the LCD panel A50 is not smooth and the displaying efficiency is also reduced.

SUMMARY OF THE INVENTION

To solve the aforesaid technical problems in the present invention, the present invention provides a modification device and method for selectively modifying the transmission performance of image frame data. Even if the bus width (or bus size) of a transmission interface is reduced, the modification device and method according to the present invention will be able to maintain the display smoothness of an image display, such as a liquid crystal panel. The disclosed modification device and method is basically actuated when the bus width of the current transmission interface is smaller than a general preset bus width. The modification device and method is capable of determining an optimized transmission to transmit the frame data to the image display. Therefore, the image display efficiency is not affected even if the bus width of the current transmission interface becomes smaller or if the current image display has a different specification and causes limitations on data transmission.

In an embodiment according to the present invention, a device is provided for selectively modifying the transmission performance of a frame data. The frame data is transmitted through a transmission interface toward an image display and under a corresponding interface protocol. The device includes a detection circuit, a processing circuit and a transmission circuit. The detection circuit detects a data size of the frame data and provides a transmission control signal based on the detection of the data size. The processing circuit selectively divides the frame data by a factor M based on the transmission control signal. And the transmission circuit is to transmit the divided frame data at a modified transmission clock rate based on the factor M.

In some implementations of the present invention, the frame data is divided by the factor M if the data size of the frame data is greater than the bus size of the transmission interface toward the image display. In another case, the factor M is a function of the data size of the frame data and the bus size of the transmission interface. For certain case the factor M equals to the data size of the frame data divided by the bus size of the transmission interface. And possibly, the factor M is an integer no less than 2 if the data size of the frame data is greater than the bus size of the transmission interface toward the image display. Besides, the modified transmission clock rate may be equal to the factor M times a preset transmission clock rate.

In other implementations of the present invention, the frame data is stored in a first storage and the processing circuit accesses the frame data directly or indirectly from the first storage. Moreover, the divided frame data about to be transmitted toward the image display may be temporarily stored into a second storage until the whole frame data is transmitted.

In another embodiment according to the present invention, a method is provided for selectively modifying the transmission performance of a frame data. The method includes the following steps. First of all, detect a data size of the frame data; next, provide a transmission control signal based on the detection of the data size; then, selectively divide the frame data by a factor M based on the transmission control signal; and afterwards, transmit the divided frame data at a modified transmission clock rate based on the factor M. The method may further include a step of temporarily storing the divided frame data about to be transmitted toward the image display until the whole frame data is transmitted.

In another embodiment according to the present invention, a modification device is provided for selectively modifying the transmission performance of a frame data, The modification device detects a data size of the frame data first and further selectively divides the frame data by a factor M if the data size of the frame data is greater than a bus size of the transmission interface, thereby making the data size of the divided frame data not greater than the bus size of the transmission interface. By the modification device the divide frame data is transmitted afterwards at a modified transmission clock rate based on the factor M to maintain the same transmission amount of the frame data in a unit transmission period.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1A:
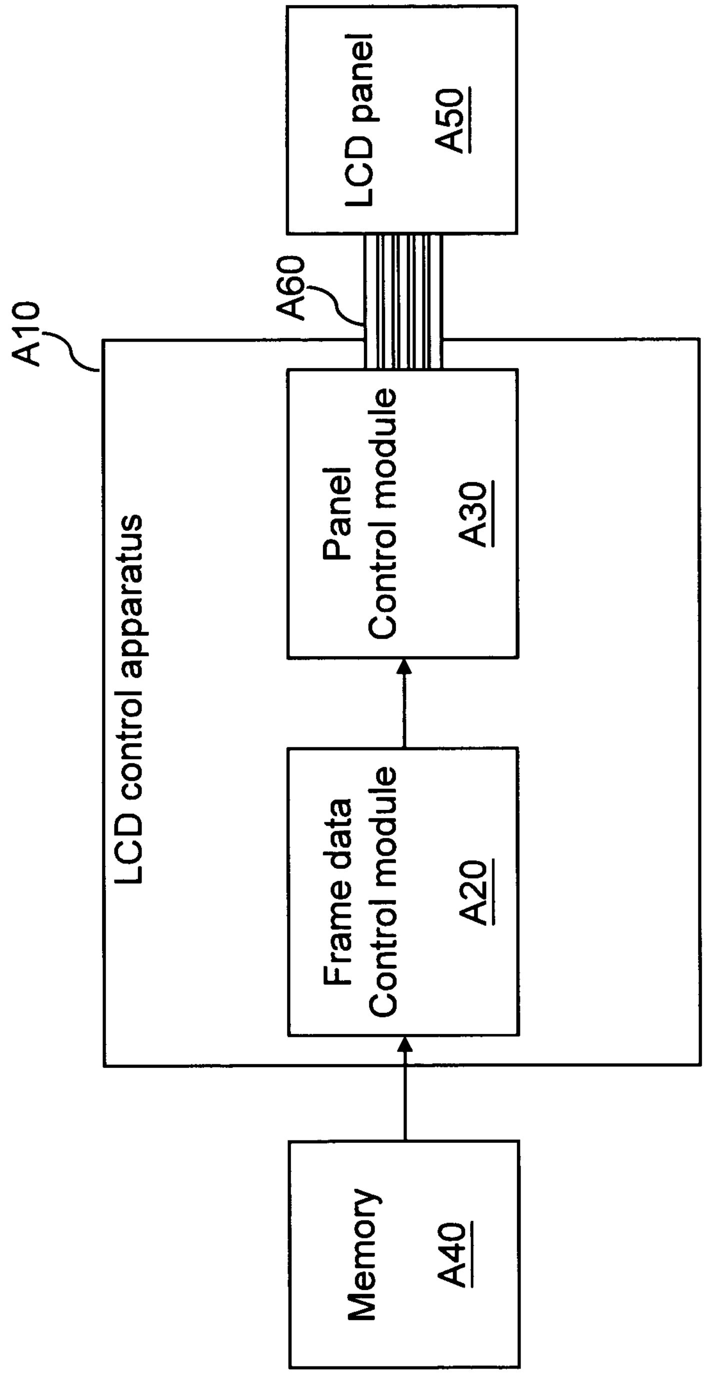
FIG. 1A (Prior Art)
FIG. 1A is a schematic block diagram showing the basic architecture of a LCD control apparatus in the prior art.

Reference will now be made in detail to the present preferred embodiments of the invention, examples of which are illustrated in the accompanying drawings. Wherever possible, the same reference numbers are used in the drawings and the description refers to the same or the like parts.

Figure 2A:
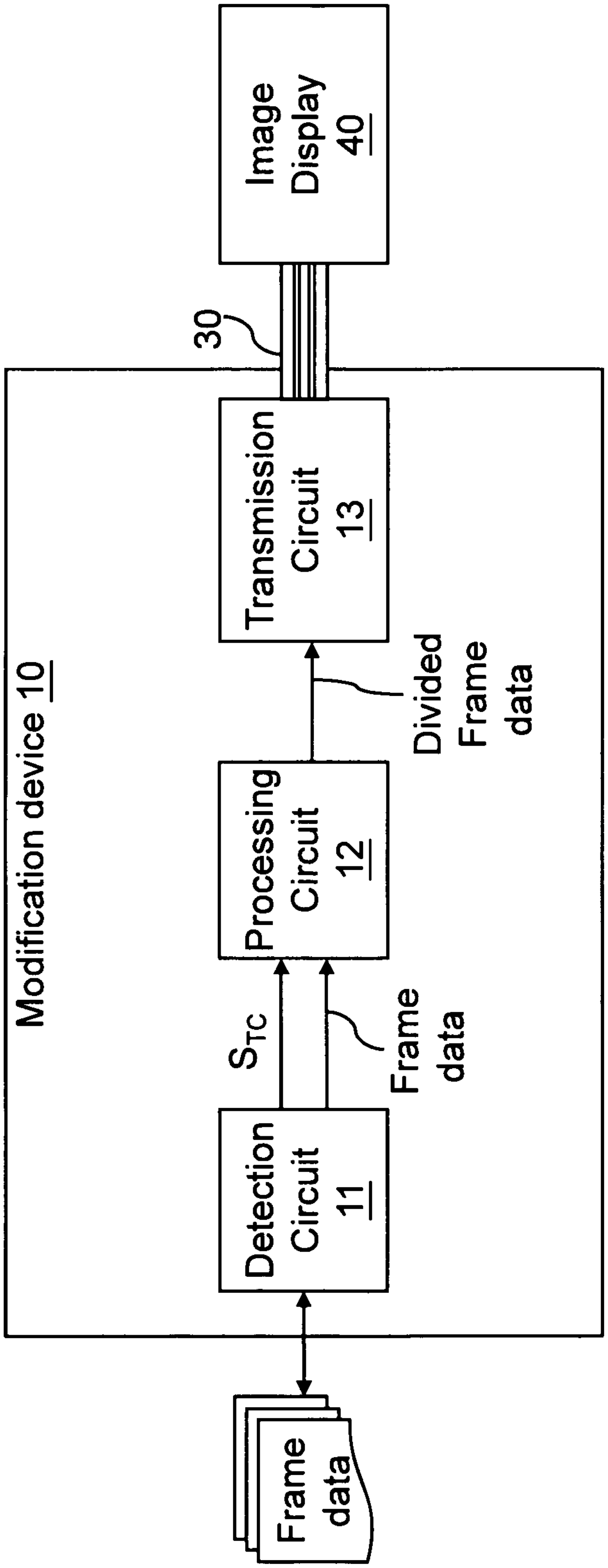
FIG. 2A is an explanatory block diagram according to a preferred embodiment of the present invention, showing a modification device for selectively modifying the transmission performance of image frame data.
Figure 2B:
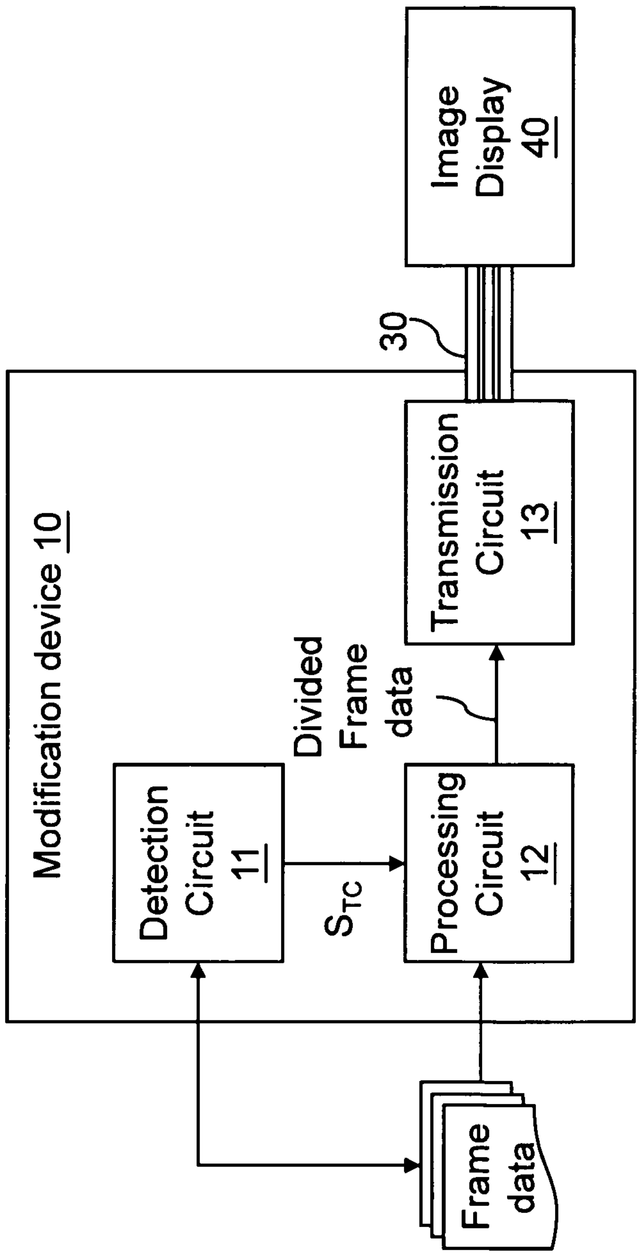
FIG. 2B is another explanatory block diagram according to another preferred embodiment of the present invention, showing another modification device for selectively modifying the transmission performance of image frame data.

Please refer to FIGS. 2A and 2B, which are explanatory block diagrams according to preferred embodiments of the present invention, showing a modification device for selectively modifying the transmission performance of image frame data. As shown in FIG. 2A or 2B, a modification device 10 is used to modify the frame data and transmit through a transmission interface 30 toward an image display 40.

The transmission interface 30 in the present invention is a bus type interface, such as a parallel bus or a parallel transmission interface. The image display 40 of the present invention is likely a display panel such as LCD panel (or liquid crystal panel) configured on an electronic device. Generally for different interface protocols of the image panel 40, there will be corresponding bus widths. For example, the preset bus width will be 16 bits if the interface protocol of a LCD panel is RGB 565; and the preset bus width will be 18 bits if the interface protocol of another LCD panel is RGB 666. On the other hand, the transmission clock rate needs to be correspondingly changed if the interface protocol of the image display changes.

When the frame data is input to the modification device 10, to avoid the matching problems between the frame data size and transmission width in the prior art, the modification device 10 needs to detect the data size of the frame data and determine if the frame data size is greater than the bus size (or bus width) of the transmission interface. If the result is positive, then the modification device 10 will further selectively divide the frame data by a factor M to make the data size of the divided frame data match (or not greater than) the bus size of the transmission interface 30. This factor M may be fixed or changeable based on the difference range between the frame data size and the bus size of the transmission interface 30. Except the processing of the frame data size, the modification device 10 will also change the transmission clock rate of the divide frame data and transmit to the image display 40 afterwards. The transmission clock rate here maybe modified based on the factor M to fit or match the interface protocol of the transmission interface 30, and more importantly, to maintain the same transmission amount of the frame data in a unit transmission period.

In FIGS. 2A and 2B the modification device 10 mainly includes a detection circuit 11, a processing unit 12 and a transmission circuit 13 in circuit connection with each other. The processing unit 12 may be configured in circuit connection between the detection circuit 11 and the transmission circuit 13, and accesses/receives the frame data through the detection circuit 11, as shown in FIG. 2A. Or, the processing circuit 11 may have direct access to the frame data, as shown in FIG. 2B. An integrated circuit (or chip) plus appropriate firmware is practical to realize the modification device 10; a programmable logic or embedded controller may also possibly implement all the functions of the modification device 10.

The detection circuit 11 is used to detect a data size of the frame data and determine if the data size of the frame data is greater than the bus size of the current transmission interface. If the result is positive, the detection circuit 11 generates and provides a transmission control signal $S_{TC}$ based on the detection of the data size. The transmission control signal $S_{TC}$ will be sent to the processing circuit 12 as a notice to ask the processing circuit 12 to further modify the frame data. From the position of the modification device 10, it is at a modification mode and starts with certain modification operation.

The processing circuit now selectively divides the frame data by the factor M based on the transmission control signal S.sub.TC. Namely, the frame data will be divided into smaller parts to match the bus size of the transmission interface 30. To fulfill the interface protocol of the transmission interface 30, the transmission circuit 13 will transmit the divided frame data at a modified transmission clock rate based on the factor M. In some cases, the modified transmission clock rate equals to M times a preset transmission clock rate. Generally, if the data size is greater than the bus size, the modified transmission clock rate is likely higher than the preset one. By means of downsizing the frame data size and modifying (such as raising) the transmission clock rate, the modification device 10 will be able to transmit the same amount of the frame data during a unit transmission period. Thus, the display smoothness may be maintained as usual.

This factor M may be fixed or changeable based on the difference range between the data size of the frame data and the bus size of the transmission interface 30. In short, M is a function of the data size of the frame data and the bus size of the current transmission interface 30. For example:

$$M=(\text{data size of frame data})/(\text{bus size of current transmission interface})$$

In some cases, the factor M may be an integer no less than 2 if the data size of the frame data is greater than the bus size of the transmission interface. Namely, the frame data will be divided into M parts and each is smaller enough to match the bus size of the transmission interface. However, the factor M is also possible not to be determined directly from the frame data size or the bus size. That is, M is possible to be a preset value and used whenever the data size of the frame data is greater than the bus size of the transmission interface.

Figure 1B:
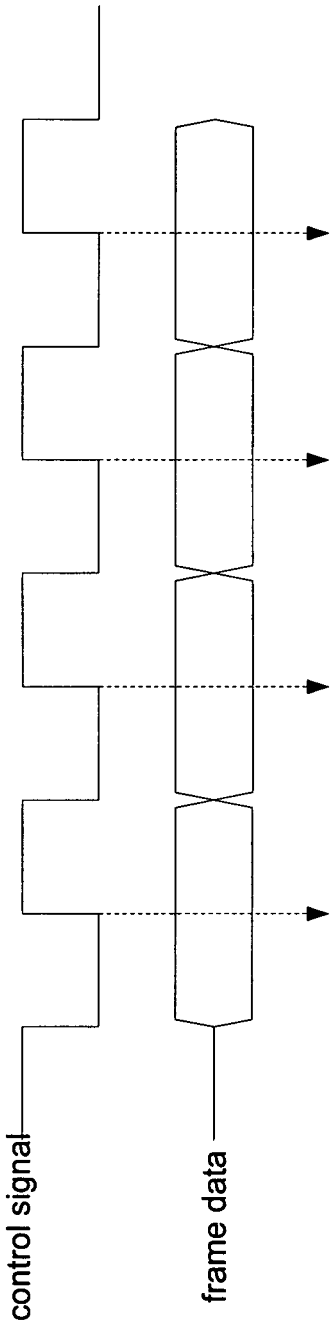
FIG. 1B (Prior Art)
FIG. 1B is a schematic diagram showing the transmission of the control signal and the frame data.
Figure 3:
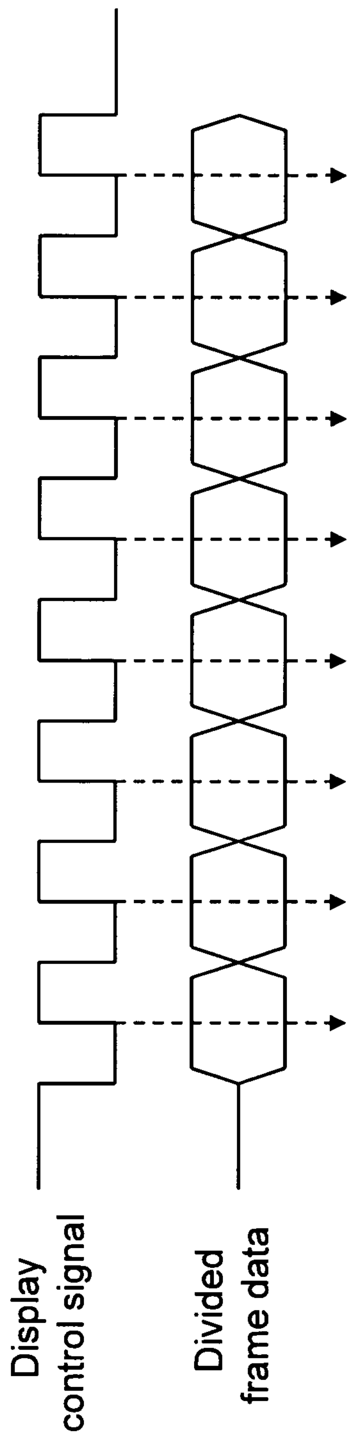
FIG. 3 is a schematic diagram according to the present invention, showing the transmission of the control signal and the frame data at a modification mode.

Please refer to FIG. 3, which is a schematic diagram according to the present invention, showing the transmission of a display control signal and the frame data at a modification mode. Here we may refer to FIG. 1B simultaneously so as to understand the difference of the frame data and the display control signal between the prior art and the present invention. The bus size of the transmission interface 30 in FIG. 3 is half the preset bus size in the example disclosed in FIG. 1B. If the frame data has the same data size here, plus in this case we use the factor M as "the data size of the frame data" divided by "the bus size of the transmission interface", M will be 2. That is to say if originally a frame data with 18-bit data size could be transmitted every time (in a unit transmission period), then in the present situation only 9 bits frame data may be transmitted each time. It is because the bus size of the transmission interface 30 is reduced to half, and only half frame data (9 bits) can now be transmitted each time.

Furthermore, as shown in FIG. 3, now we need two display control signals to trigger the two writing operations and write the same 18 bits frame data into the image display. Since we need to maintain the transmitting amount of the frame data to obtain the same display smoothness of the image display, the transmission clock rate in FIG. 3 is twice the original clock rate. That is, the current transmission clock rate is the original clock rate times M, where M is 2 in this case. Therefore, the fluency of the frame data shown on the image display is not affected even if the bus size of the transmission interface becomes smaller.

Figure 4:
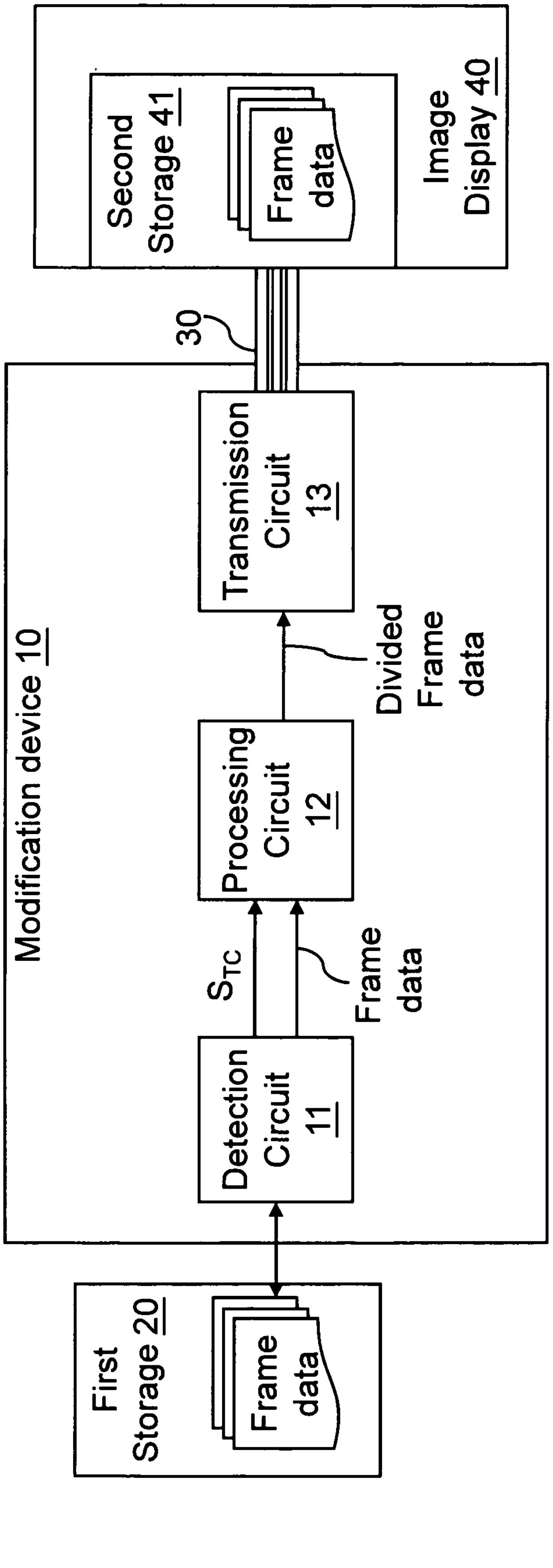
FIG. 4 is another explanatory block diagram according to another preferred embodiment of the present invention, showing another modification device for selectively modifying the transmission performance of image frame data.

Please refer to FIG. 4, which is another explanatory block diagram according to another preferred embodiment of the present invention, showing another modification device for selectively modifying the transmission performance of image frame data.

The modification device 10 is the same as the one disclosed in FIG. 2A, only the storage operations of the frame data have some differences. The frame data is originally stored in a first storage. In this case the detection circuit 11 may detect the data size of the frame data by accessing the first storage 20. The processing circuit 12 will retrieve the frame data through direct/indirect access to the first storage 20. After the processing circuit 12 divides the frame data according to the factor M based on the transmission control signal $S_{TC}$ from the detection circuit 11, the divided frame data are transmitted by the transmission circuit 13 at a modified transmission clock rate, such as M times the original clock rate. The divided frame data will need to be piece together before displayed on the image display 40. Therefore, a second storage 41 is now used to temporarily store the divided frame data about to be transmitted toward the image display until the whole frame data is transmitted. The location and type of the first storage 20 or the second storage 41 is not limited to those disclosed in FIG. 4 in actual implementation.

Figure 5:
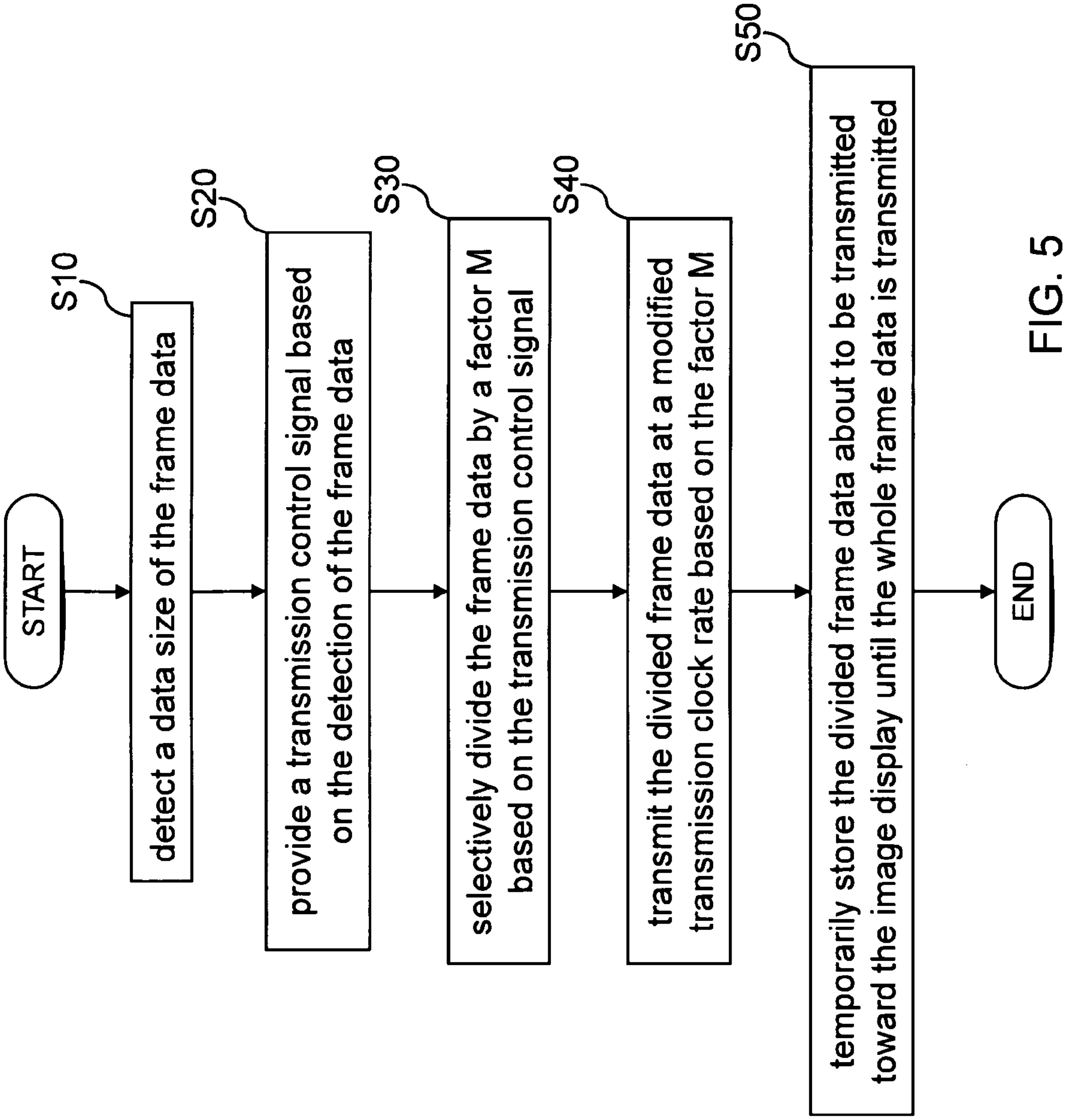
FIG. 5 is an explanatory flow chart of another preferred embodiment according to the present invention, showing a modification method for selectively modifying the transmission performance of image frame data.

Please refer to FIG. 5, which is an explanatory flow chart of another preferred embodiment according to the present invention, showing a modification method for selectively modifying the transmission performance of image frame data. The modification method may be executed by the modification device disclosed in the present invention but not limited to the composition or operation of the detection circuit, the processing circuit and the transmission circuit mentioned in the aforesaid embodiments. Please also refer to all the embodiments disclosed above. The modification method mainly includes the following steps, which are all explained or implied in said embodiments.

First of all, in step S10, detect a data size of the frame data. Next, in step S20, provide a transmission control signal based on the detection of the frame data. In step S30, selectively divide the frame data by a factor M based on the transmission control signal. Basically the frame data is divided by the factor M if the data size of the frame data is greater than the bus size of the transmission interface toward the image display. Besides, the factor M may be (1) a function of the data size of the frame data and the bus size of the transmission interface; or (2) equal to the data size of the frame data divided by the bus size of the transmission interface; or (3) an integer no less than 2 if the data size of the frame data is greater than the bus size of the transmission interface toward the image display.

Then in step S40, transmit the divided frame data at a modified transmission clock rate based on the factor M. in some cases, the modified transmission clock rate may equal to the factor M times a preset transmission clock rate. Afterwards, in step S50, temporarily store the divided frame data about to be transmitted toward the image display until the whole frame data is transmitted.

Through the modification method disclosed above, the same amount of the frame data will still be transmitted to the image display in a unit transmission period, even if the bus size of the transmission interface toward the image display is smaller.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A device for selectively modifying the transmission performance of a frame data having a data size and a preset transmission clock rate, the frame data being transmitted through a transmission interface toward an image display and under a corresponding interface protocol, the device comprising:

a detection circuit for detecting the data size of the frame data and providing a transmission control signal based on the detection of the data size;

a processing circuit for selectively dividing the frame data by a factor M based on the transmission control signal; and a transmission circuit for transmitting the divided frame data at a modified transmission clock rate determined according to the factor M and the preset transmission clock rate.

2. The device of claim 1, wherein the frame data is divided by the factor M if the data size of the frame data is greater than the bus size of the transmission interface toward the image display.

3. The device of claim 1, wherein the factor M is a function of the data size of the frame data and the bus size of the transmission interface.

4. The device of claim 1, wherein the factor M equals to the data size of the frame data divided by the bus size of the transmission interface.

5. The device of claim 1, wherein the factor M is an integer no less than 2 if the data size of the frame data is greater than the bus size of the transmission interface toward the image display.

6. The device of claim 1, wherein the modified transmission clock rate equals to the factor M times the preset transmission clock rate.

7. The device of claim 1, wherein the frame data is stored in a first storage, the processing circuit accessing the frame data directly or indirectly from the first storage.

8. The device of claim 1, wherein the divided frame data about to be transmitted toward the image display is temporarily stored into a second storage until the whole frame data is transmitted.

9. A method for selectively modifying the transmission performance of a frame data having a data size and a preset transmission clock rate, the frame data being transmitted through a parallel transmission interface toward an image display, the method comprising the steps of:

detecting the data size of the frame data; providing a transmission control signal based on the detection of the data size;

selectively dividing the frame data by a factor M based on the transmission control signal; and transmitting the divided frame data at a modified transmission clock rate determined according to the factor M and the preset transmission clock rate.

10. The method of claim 9 further comprising a step of temporarily storing the divided frame data about to be transmitted toward the image display until the whole frame data is transmitted.

11. The method of claim 9, wherein the frame data is divided by the factor M if the data size of the frame data is greater than the bus size of the transmission interface toward the image display.

12. The method of claim 9, wherein the factor M is a function of the data size of the frame data and the bus size of the transmission interface.

13. The method of claim 9, wherein the factor M equals to the data size of the frame data divided by the bus size of the transmission interface.

14. The method of claim 9, wherein the factor M is an integer no less than 2 if the data size of the frame data is greater than the bus size of the transmission interface toward the image display.

15. The method of claim 9, wherein the modified transmission clock rate equals to the factor M times the preset transmission clock rate.

16. A modification device for selectively modifying the transmission performance of a frame data having a data size and a preset transmission clock rate, the frame data transmitted through a transmission interface toward an image display, the modification device detecting the data size of the frame data first and further selectively dividing the frame data by a factor M if the data size of the frame data is greater than a bus size of the transmission interface, thereby making the data size of the divided frame data not greater than the bus size of the transmission interface, by the modification device the divide frame data being transmitted afterwards at a modified transmission clock rate determined according to the factor M and the preset transmission clock rate so as to maintain the same transmission amount of the frame data in a unit transmission period relative to the preset transmission clock rate.

17. The device of claim 16, wherein the frame data is divided by the factor M if the data size of the frame data is greater than the bus size of the transmission interface toward the image display.

18. The device of claim 16, wherein the factor M is a function of the data size of the frame data and the bus size of the transmission interface.

19. The device of claim 16, wherein the factor M equals to the data size of the frame data divided by the bus size of the transmission interface.

20. The device of claim 16, wherein the factor M is an integer no less than 2 if the data size of the frame data is greater than the bus size of the transmission interface toward the image display.

21. The device of claim 16, wherein the modified transmission clock rate equals to the factor M times the preset transmission clock rate.

* * * * *